United States Patent [19]

Russell, Jr. et al.

[11] 4,071,017
[45] Jan. 31, 1978

[54] TENSIONED REFLECTOR SUPPORT SYSTEM

[75] Inventors: John L. Russell, Jr.; Robert Edward Potthoff, both of La Jolla, Calif.

[73] Assignee: General Atomic Company, San Diego, Calif.

[21] Appl. No.: 701,647

[22] Filed: July 1, 1976

[51] Int. Cl.² .................................................. F24J 3/02
[52] U.S. Cl. ..................... 126/271; 237/1 A; 248/488; 350/292; 126/270
[58] Field of Search ............... 126/270, 271; 237/1 A; 350/292, 310; 248/475 R, 488; 60/641; 52/489

[56] References Cited

U.S. PATENT DOCUMENTS

| 73,355 | 1/1868 | Marshall | 126/270 |
|---|---|---|---|
| 1,951,404 | 3/1934 | Goddard | 126/270 |
| 2,945,417 | 7/1960 | Caryl et al. | 126/270 |
| 3,868,823 | 3/1975 | Russell et al. | 126/271 |

Primary Examiner—Kenneth W. Sprague
Assistant Examiner—James C. Yeung
Attorney, Agent, or Firm—Fitch, Even, Tabin & Luedeka

[57] ABSTRACT

A system for supporting a plurality of reflective surfaces in an arrangement for reflecting the rays emitted from a source of energy and converging the reflected rays to concentrate the heating effect thereof at a receptor, whereby a plurality of pairs of long tension members extend under tension between firmly anchored support members. Reflecting elements are supported by the pairs of tension members and each of the pairs is disposed to reflect the radiation from substantially all of the reflecting elements to the receptor.

24 Claims, 23 Drawing Figures

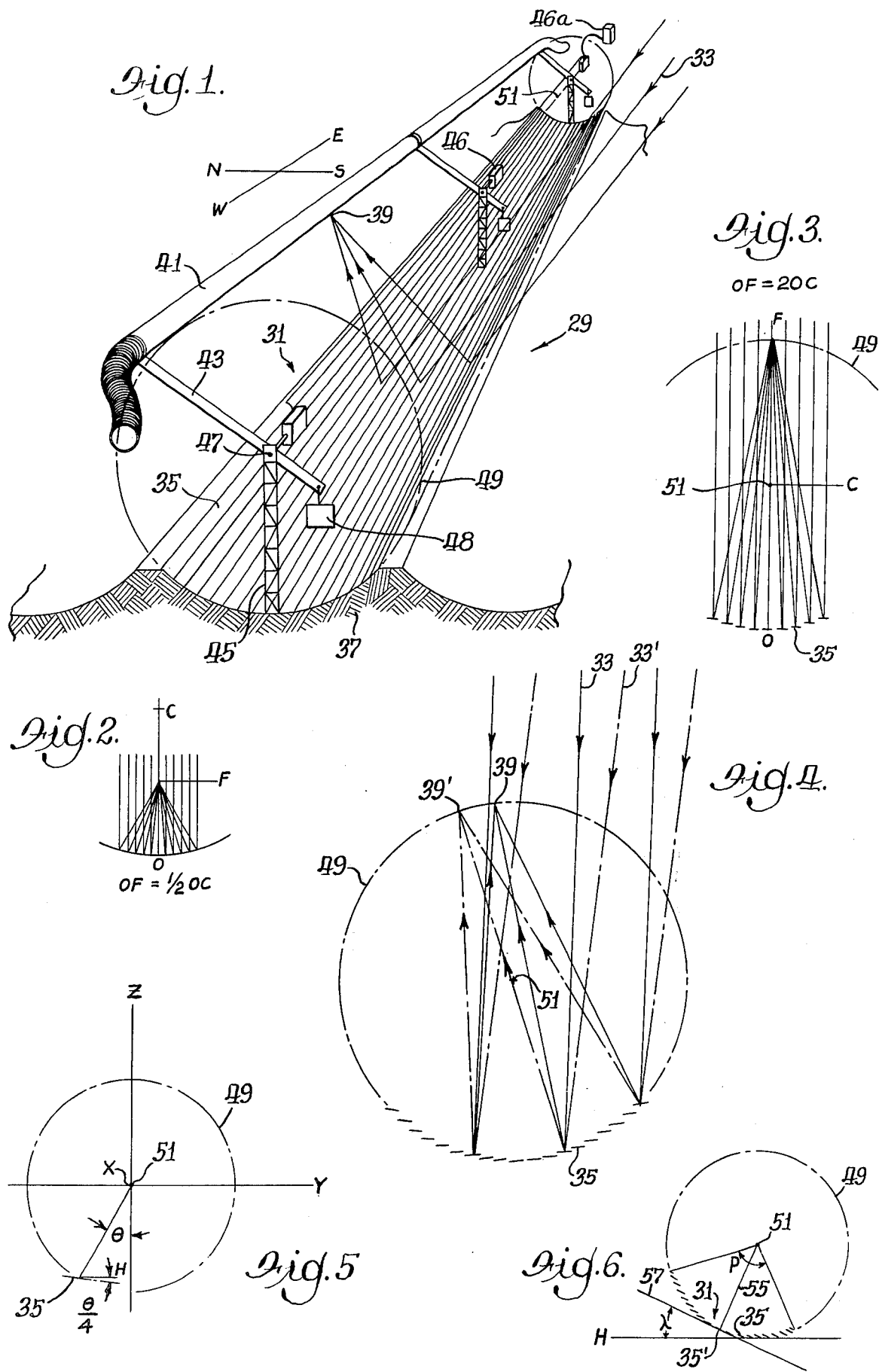

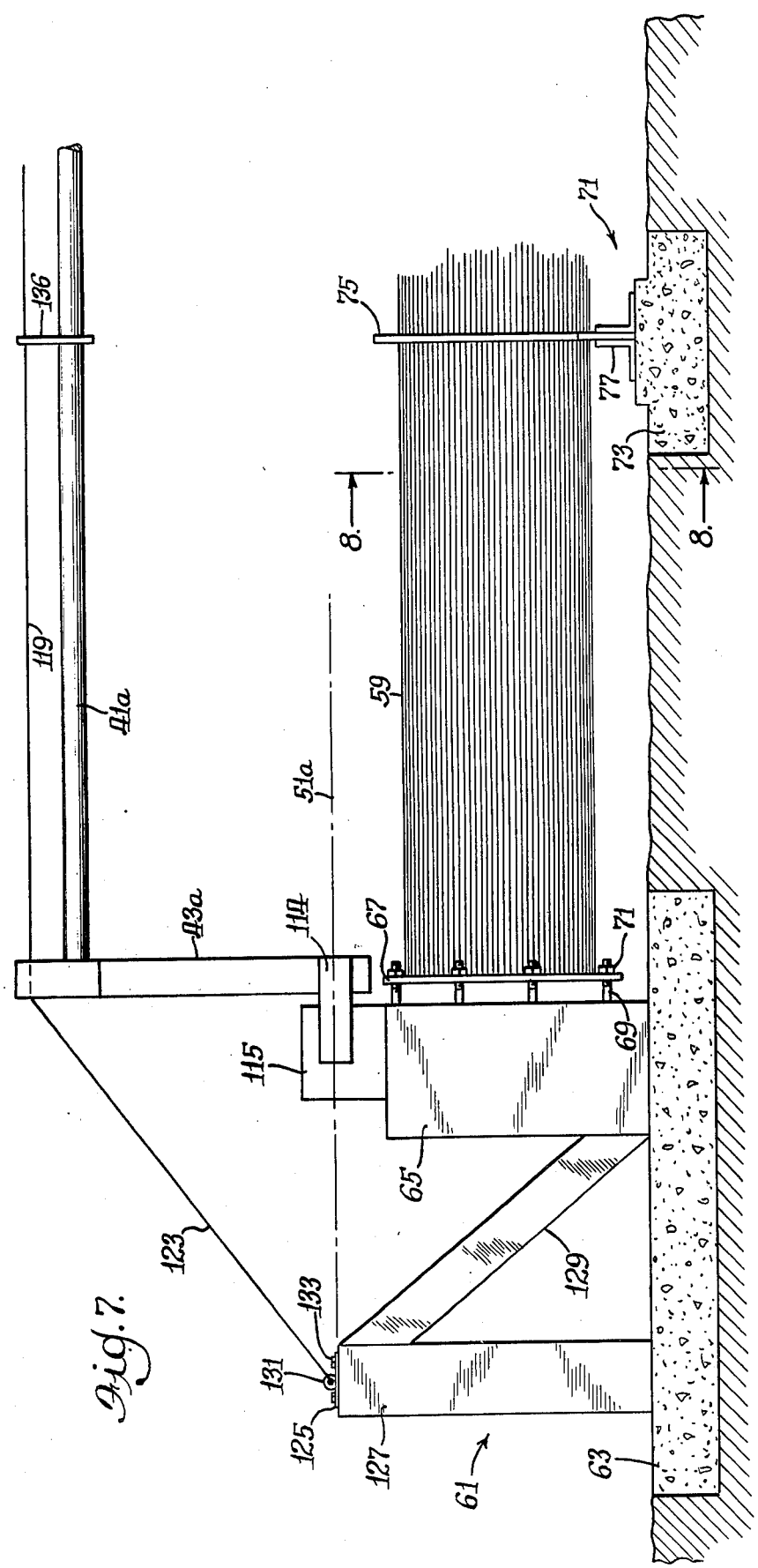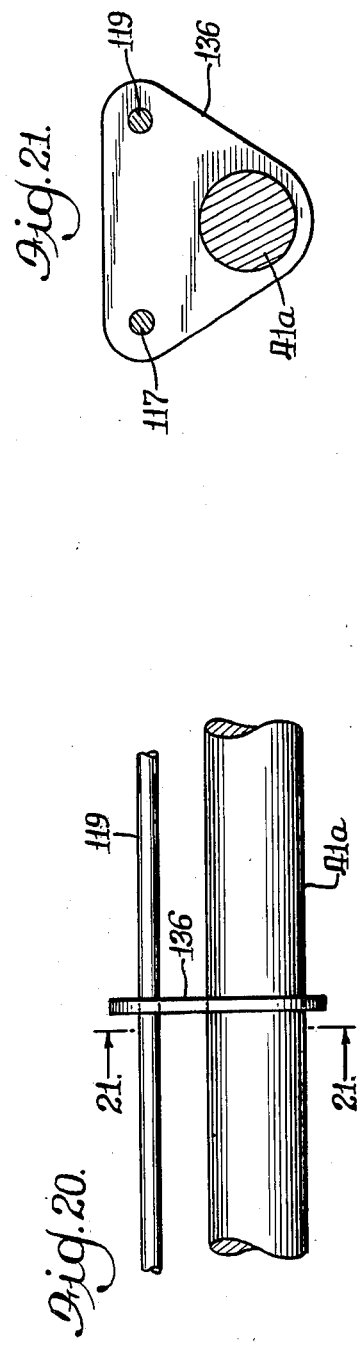

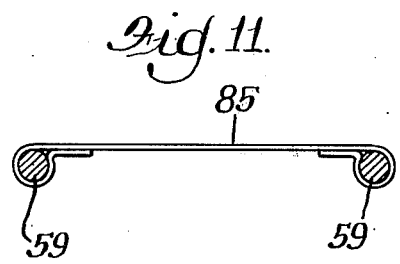
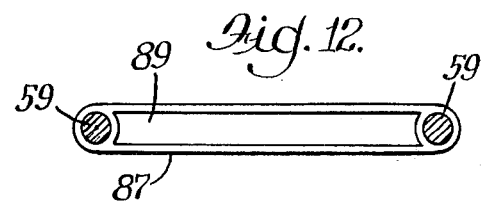
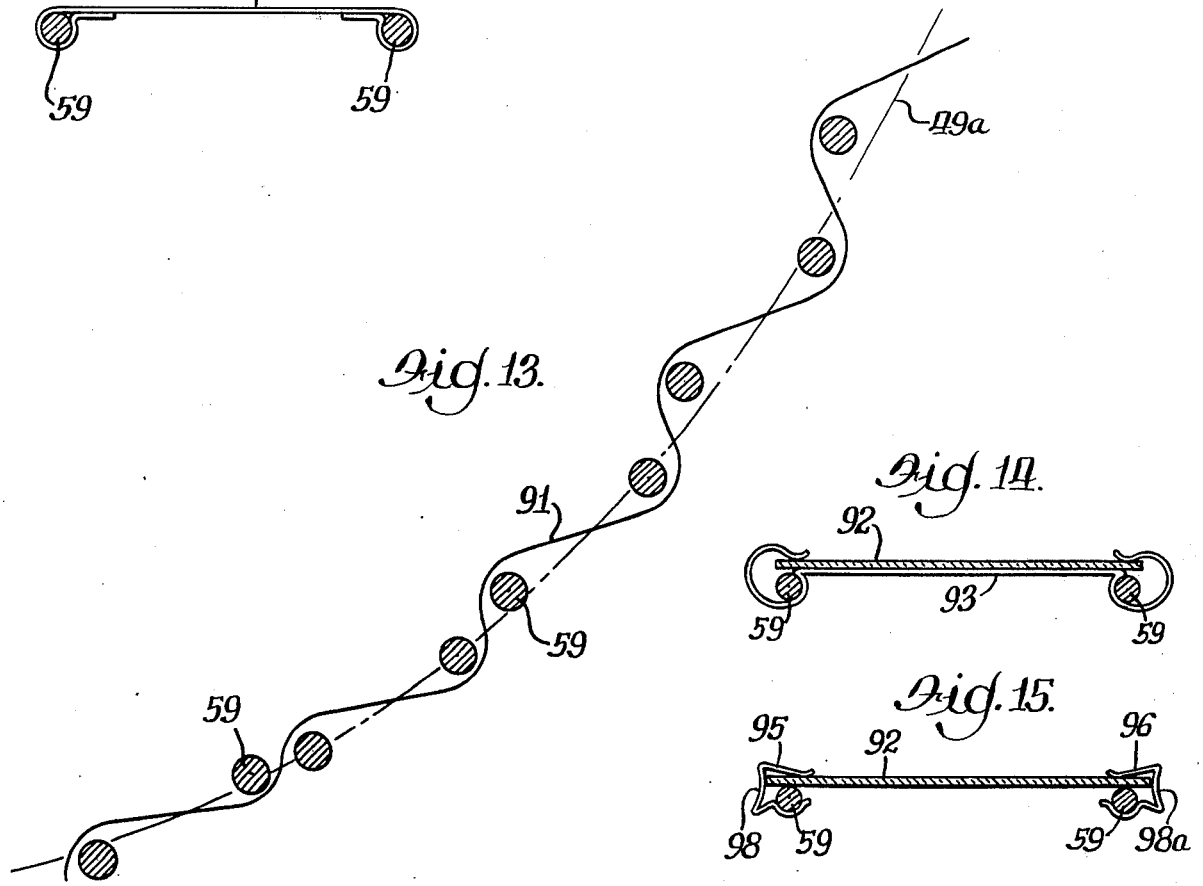
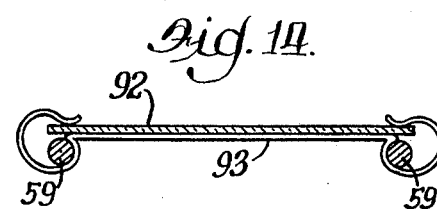
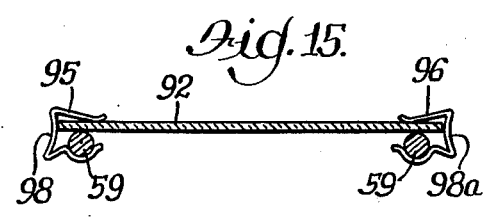
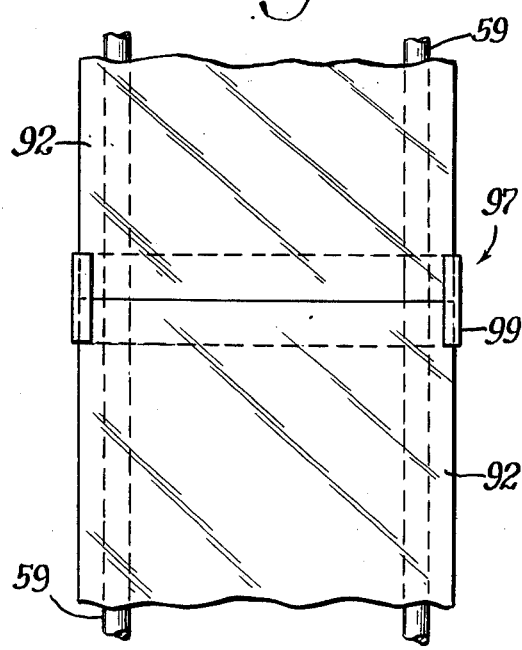
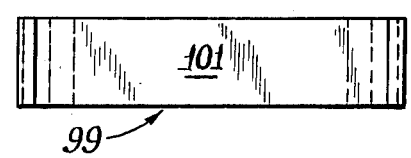
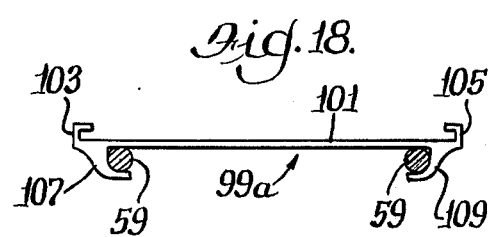
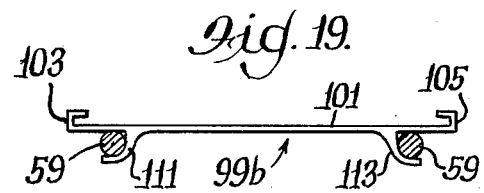

TENSIONED REFLECTOR SUPPORT SYSTEM

This invention relates to the concentrating of radiant energy and more specifically relates to a support system for a concentrator.

The use of radiant energy in the derivation of work for various industrial purposes is generally known in the art. This use centers mostly around devices that focus or concentrate the energy and then utilize the heating effect to derive useful work from that energy.

Utilization of solar rays, for example, has come to the fore as public sensitivity to the environment coupled with the awareness of the rapidly depleting natural resources have made the production of energy a matter of public concern.

The relatively low power density of sunlight at the earth's surface, however, impedes its economical utilization as a direct heat source. Various multiple mirror concentrators have been constructed in such a manner as to reflect solar rays onto a fixed target. Because of the relative movement between the earth and the sun, the angles of the incident rays from the sun upon the mirrors continuously vary. To accommodate this continuous change, various movable arrangements of mirrors have been coupled with various control means to cause these mirrors to automatically track the sun as the earth rotates, the energy then being concentrated at a fixed receiver. There are disadvantages in these arrangements for large scale production of heat, and these include the high cost of mechanically supporting the structures, many of which are complex, for effective operation. Thus, commercial development of such mirror arrangements, for example, for large scale utilization of solar energy has been economically impractical. U.S. Pat. No. 3,868,823, issued Mar. 4, 1975 and assigned to the same assignee as this application, discloses a concentrator having surfaces which reflect substantially parallel incident rays to a receptor which moves in response to a change in angle of the incident rays. The patent further discloses a method and system for a practical utilization of the concentrator. In contrast to the prior art, the invention disclosed in that patent provides a fixed mirror, perhaps molded into the surface of the earth, and a heat collector arranged to receive reflected solar rays focused at an image that moves in response to the relative movement between the earth and the sun. The concentrator described in that patent is known as a fixed mirror solar concentrator (FMSC).

The mirror includes a plurality of long, narrow, flat reflecting surfaces arranged along a portion of the surface of a reference cylinder. The reflecting surfaces face inwardly of the cylinder and are individually inclined from side edge to side edge so that the focal distance of the entire array of surfaces is twice the radius of the cylinder. This causes the line image to always fall on the reference cylinder, and a heat collector is supported on arms that pivot at the center of the reference cylinder to move the collector along the surface of the reference cylinder in coincidence with the moving image.

This arrangement of reflecting surfaces is practical for concentrating radiation and collecting heat over large areas, and the earth is one natural base for such an arrangement. As indicated in the patent, conventional earth moving equipment may be adapted to carve out a shape in the earth's surface for the reflector bed. Such factors as the desired accuracy of bed layout and the terrain of the location where the concentrator is to be constructed, however, may cause excessive construction costs for the earth embedded reflecting surfaces. Therefore, an alternative support system for concentrators that provides for accurate reflecting at a relatively low cost and that has broad location uses is desirable.

Accordingly, it is an object of this invention to provide a support system for concentrators that enables accurate reflecting at a relatively low cost and that has broad location uses.

This and other objects of the invention are more particularly set forth in the following detailed description and in the accompanying drawings of which:

FIG. 1 is a pictorial perspective view of a concentrator with a cylinder of reference shown in phantom and the reflecting surfaces are shown embedded in the earth's surface;

FIG. 2 is a diagrammatic view illustrating rays reflecting from a typical concave spherical reflective surface, and particularly depicting the relation between the center of curvature of the reflecting surface and the focal point of the reflecting rays;

FIG. 3 is a diagrammatic view illustrating rays reflecting from a particular arrangement of a plurality of reflective surfaces comprising the reflective of the concentrator of FIG. 1 and depicting the relation between the center of curvature of the arrangement and the focal point of the reflected rays;

FIG. 4 is a diagrammatic view illustrating the converging rays from the reflecting surfaces of the concentrator of FIG. 1 and the location of a focus of the rays having one incident angle and of a focus of the rays having a different incident angle;

FIG. 5 is a graphical representation of the disposition of each reflective surface comprising the reflector concentrator of FIG. 1;

FIG. 6 is a graphical representation of the cylinder of reference of FIG. 1 illustrating the relationship of the arrangement of the reflective surfaces of the concentrator to the axis of the reference cylinder and the reference cylinder being rotated to an alternative position to incline the arrangement of reflective surfaces of the concentrator of FIG. 1;

FIG. 7 is a schematic representation in elevation of a portion of a support system for a concentrator having the principles of that shown in FIG. 1, but constructed in accordance with a preferred embodiment of this invention;

FIG. 11 is an end view of a pair of tension members of the support system of FIG. 7 and illustrating a reflective surface and one form thereof utilized for attaching the surface to the pair of tension members to form a reflector for the concentrator of FIG. 7;

FIG. 12 is a view similar to FIG. 11 and illustrating another form of a reflective surface utilized for attaching the surface to the pair of tension members and also illustrating an intermediate spacing device for the tension members;

FIG. 13 is an end view of an array of several pairs of tension members and illustrating a transversely continuous reflective surface utilized therewith for forming an alternative construction of a reflector for the concentrator of FIG. 7;

FIG. 14 is an end view of a pair of tension members and an alternative reflective surface in the form of a glass mirror strip used therewith and illustrating a clip arrangement for both attaching the glass to the tension members and spacing the members;

FIG. 15 is a view similar to that of FIG. 14 and illustrating another clip arrangement for both attaching the glass to the tension members and spacing the members;

FIG. 16 is a plan view of a portion of a mounted glass mirror strip and specifically illustrating a splice of mirror segments used in forming the mirror strip;

FIG. 17 is a plan view of a clip used in the splice illustrated in FIG. 16;

FIG. 18 is an edge view of one form of the clip of FIG. 17;

FIG. 19 is an edge view of another form of the clip of FIG. 17;

FIG. 20 is an enlarged fragmentary view in elevation of a receptor and supporting elements therefore used in the concentrator of FIG. 7;

FIG. 21 is a sectional view taken along the line 21—21 of FIG. 20;

Figure 8:
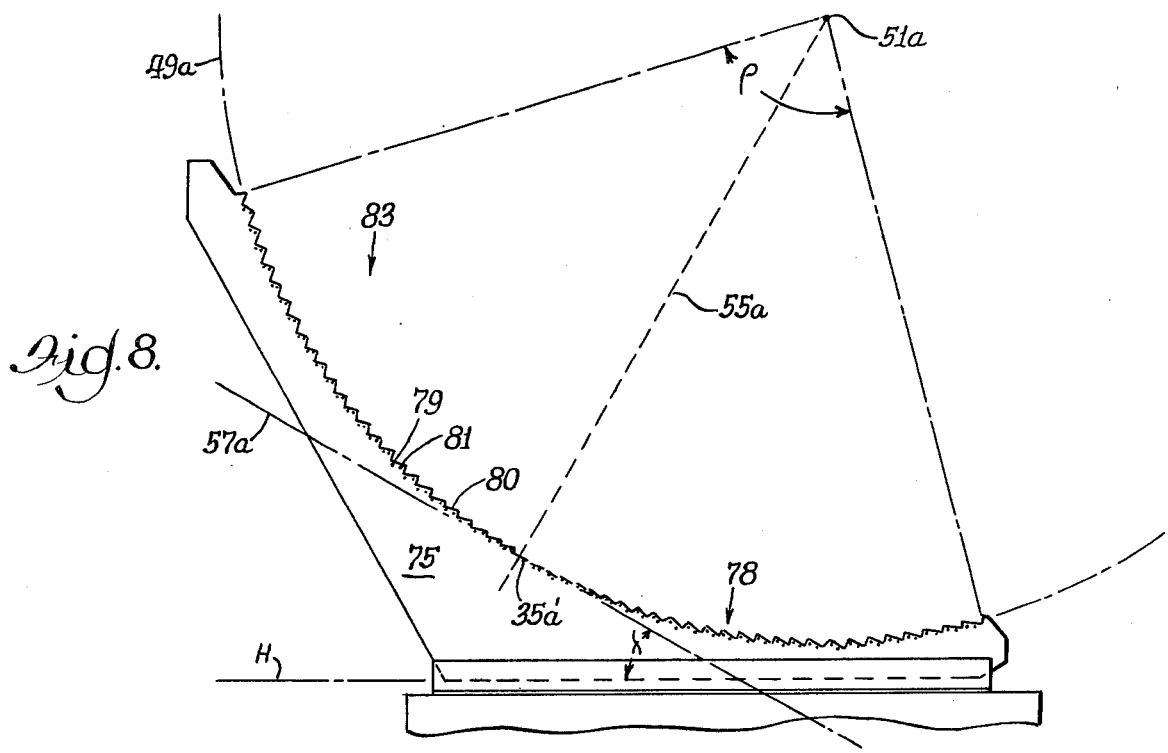
FIG. 8 is a side view of an intermediate support member for the support system taken along the line 8—8 of FIG. 7.

As a short, general summary of the principles described in the aforementioned U.S. Pat. No. 3,868,823, the fixed mirror concentrator utilizes a particular geometry in the form of a fixed, stepped reflective surface that in its transverse direction generally defines a portion of the surface of a cylinder. This arrangement produces a sharply focused line image irrespective of the incident angle at which the rays from a source of energy impinge upon the reflective surface. This line image always lies on a portion of the surface of the same cylinder as that of the reflective surface, thus enabling a movable receiver or heat absorber pipe to be mounted on an arm which rotates about the center of this cylinder.

To simplify this description, the concentrator is hereafter referred to as a solar concentrator, the source of energy thus being the sun. It should be understood, however, that just as there was no intention of limiting the use of the invention of U.S. Pat. No. 3,868,823 to only the concentration of rays from the sun, the principles being effective for concentrating radiation from local sources as well, there also is no intention of limiting the application of the principles of this invention to only solar concentrators.

Reflecting surface accuracy and alignment are critical to accurate focusing, and all of these are important for high performance solar concentration. The less cost involved in a system to accomplish this concentration, the more desirable the system for large scale concentration. In accordance with this invention, there is provided a tensioned support system that satisfies these criteria for supporting a concentrator, especially of the fixed mirror type, although the principles may be applied to other types of concentrators as well.

The complete description of the fixed mirror concentrator contained in the aforementioned U.S. Pat. No. 3,868,823 is incorporated herein by reference. To facilitate the understanding of this invention, however, the following paragraphs are derived from that patent and are provided as background.

Referring first to FIG. 1, a concentrator 29 has a reflector 31 which intercepts and reflects incoming solar rays 33. The reflector 31 comprises a plurality of reflective surfaces in the form of long, narrow strips or slats 35 adjacent each other and arranged on the surface of an arcuate base 37. As will be seen in detail hereinafter, the slats 35 cause the reflected rays to converge at a focus 39. A target receptor in the form of a pipe 41 is provided coincident with the focus to receive the converged rays. The pipe 41 is mounted on a plurality of radial arms or beams 43, which themselves are rotatably connected to a plurality of vertical supports or towers 45 at pivot points 47.

The towers 45 are supported in a conventional manner in the earth and then extend vertically through the reflector 31. Preferably, the moment of forces about the pivot points 47 are balanced. This is accomplished in the illustrated embodiment by use of suitable counterweights 48 hung on the extended end from the pivot points 47 opposite the arms 43. Suitable gears and bearings (not illustrated) are included in each mounting point 47 between each arm 43 and its tower 45. When properly balanced, the pipe 41 will retain any rotative position to which it may be placed. Thus, little force need be exerted to cause its movement. The motive force for causing the rotation of the arms 43 on their respective mounting axes is supplied by suitable driving motors 46, such as synchronous motors. All of the drive motors 46 on a given concentrator are operated from a single motor control 46a. Controlling such drive motors is well known in the art. Consequently, the details of the control 46a are not set forth herein. A suitable servo mechanism (not shown) also well known in the art, may be used in conjunction with the motor control 46a to coordinate the movement of the pipe 41 with varying angle of the sun, and, hence, the angle of incidence of the rays. Thus, the pipe 41 is movable along a portion of the upper surface of a reference cylinder 49 generated about an axis 51. The radius of the cylinder is the radius of curvature of the arcuate base 37. The axis 51 contains the pivot points 47, and the reflector 31 is situated on a lower surface of the reference cylinder 49.

The slats 35 are disposed in a specified relationship, both with respect to each other and with respect to the axis 51. As will be seen in detail hereinafter, the slats 35 are independently inclined in the direction of their widths with respect to a given plane containing the axis 51. For purposes of this initial description, the given plane is horizontal. The inclination of each of the slats is such that the rays 33 incident upon the array of slats disposed along the lower surface of the reference cylinder 49 are reflected to converge on the focus 39 somewhat on the upper surface of the reference cylinder 49, regardless of the angle of incidence of the rays 33. It is known from basic physics that the angle of incidence is equal to the angle of reflection. Thus, it can be seen that as the angle of incidence of the rays 33 varies, the focus 39 upon which the reflected rays are caused to converge must move in response to the varying angle. The particular disposition of the slats 35 is predetermined to cause the path which the focus 39 follows to lie on a portion of the upper surface of the reference cylinder 49. By means hereinafter described, the receptor or pipe 41, which is mounted to move along the same path that the focus moves in, is synchronized to move incoincidence with the focus as the focus moves in its predetermined path. Thus, the pipe is enabled to receive the heating effect of the concentrated rays even though there is relative movement between the source of energy (in this instance, the sun) and the concentrator.

If the reflector 31 were to be a conventional concave spherical surface as illustrated in FIG. 2, the angle of reflected rays would be dependent upon the slope of the curve at the point of reflection. Assume the line OC is the principal axis of the curve. It is well known in the art that rays impinging on a reflective surface parallel to the principal axis will be reflected to converge at a common point of focus. Such focus is shown as F in FIG. 2. The point C is the center of curvature. In this illustration, the length of OF is one-half that of OC. Concentrators employing this principle provide a fixed receiver at the focus and make the reflective surface movable to respond to the changing angle of the sun so as to converge the changing rays on the fixed receiver. The principle of the heliostat may be employed to control the movement of the mirror and cause it to track the path of the sun. Whether these devices utilize a reflector having a continuous surface or one having a plurality of segments constituting the surface, the physical concept of reflecting the rays is the same.

The reflector 31 of the concentrator 29 is generally conformed to the arcuate shape of the bed 37, but it is divided into a plurality of segments, each having a substantially flat surface. These segments are in the form of the slats 35, each of which has its reflective surface facing the interior of the reference cylinder 49 and is inclined laterally at a predetermined angle with respect to the horizontal, or as will be seen hereinafter, another plane of reference. The slats lie generally parallel to the axis 51. The angle of the reflected ray is dependent upon the side edge-to-side edge inclination of the slats and not on the slope of the general curve, which the centers of the slats define. Although in FIG. 1, the slats 35 are inclined with respect to the horizontal, this specific orientation is illustrative only. The slats could be related to any given plane as long as the other portions of the concentrator are related accordingly, as described hereinafter.

The result of this arrangement is seen in FIG. 3. When contrasted with FIG. 2, the departure from concentrators using conventional mirrors is readily apparent. In FIG. 3, it will be noted that the segments 35 are arranged adjacent one another along the lower surface of the reference cylinder 49. Each slat is independently inclined with respect to the horizontal and rays parallel to the principal axis OC of the curve are reflected by the slats 35 to converge at a focus F, which lies on the upper surface of the cylinder 49. If C, which is the center of curvature, is assumed to be the axis 51 of the cylinder 49, then the focal length of F is twice the length of OC. Consequently, OF becomes a diameter, and in this instance, it is the diameter of the reference cylinder 49. By substituting the focus F of FIG. 3 for the focus 39 of FIG. 1, it will be seen that the focal length of the reflector 31 of the concentrator 29 is twice the radius of curvature, as contrasted with a focal length of one-half the radius of curvature where the reflector is a spherical curve (FIG. 2).

In FIG. 4, the slats 35 of the concentrator 29 are disposed in a fixed relationship, both with respect to one another and with respect to the axis 51 of the reference cylinder 49. Incident rays 33 are shown being reflected and converged at the focus 39 on the upper surface of the reference cylinder 49. Incident rays 33', having a different angle of incidence from the rays 33, are illustrated as being reflected by the same slats, but they are converged at a focus 39'. It is noted further that the focus 39' also lies on the upper surface of the reference cylinder 49. It will be understood that incident rays having different angles from those illustrated also converge at a focus on the surface of the reference cylinder.

A detail of the specific disposition of the slats 35 that causes the reflected rays to converge at a focus on the surface of the reference cylinder is seen in FIG. 5. There a graph depicts the reference cylinder 49 and its axis 51 in respect to coordinate axes Y (horizontal) and Z (vertical). The X axis is assumed to be coincident with the axis 51 of the reference cylinder and extends perpendicular to the Y and Z axes and thus horizontally disposed. A single slat 35 is illustrated on the graph in a position along the lower surface of the reference cylinder 49. The given plane of reference is a horizontal plane containing the XY axes. Assume an angle $\theta$ between a line drawn from the axis 51 to the center of the width of the slat and a plane containing the axis 51 normal to the given plane. In this instance, the given plane, as mentioned previously, is horizontal and contains the XY axes. Thus, a plane normal thereto containing the axis 51 is a vertical plane containing the XZ axes. The slat 35 is then inclined with respect to a horizontal line H (on the graph of FIG. 5) parallel to the Y axis and inwardly toward the axis 51 by an angle equal to one-quarter of $\theta$. All of the slats are disposed in this manner. Further, by taking the vertical plane containing the axis 51 as a median plane for purposes of symmetry, then for each slat 35 disposed on one side of the median plane, there is a slat in a correlative position on the opposite side of the median plane.

It can be proven that an arcuate arrangement of reflective slats having the foregoing disposition of each slat will result in a general reflective array having a focal length of twice the radius of curvature and further that the focus will move along the upper surface of the reference cylinder on a portion of the cylinder generally opposite on the same cylinder of the portion on which the arcuate arrangement (reflector 31) is disposed. As previously stated, the diameter of the reference cylinder is twice the radius of curvature of the reflector 31.

Predetermining the path of focus to be along the surface of a cylinder as described in the foregoing simplifies the mechanics of accommodating the receptor pipe 41 and moving it in coincidence with the focus. Particular supporting structures will vary in accordance with the intended use of the reflector. For example, the structure may be of a free-standing form, or it may be embedded in the earth's surface in which situation conventional earth moving equipment can be adapted to carve out the proper shape for the reflector bed.

The given plane of reference for the slats mentioned previously most likely will be other than horizontal. The most advantageous use of the reflector 31 is obtained by rotating the bed 37 so that the slats 35 will more directly face the sun for the greater part of the day. There are slight elevation differences between surfaces of adjacent slats, and this so-called step height is off position for reflecting rays to the focus 39. Even though the step height is very small compared to the slat width, there is a certain fraction of the light that will inpinge upon the step edges and the heating effect of this light in the concentrator is lost. By inclining the entire bed 37 with respect to the horizontal H by an angle λ, as illustrated in FIG. 6, this loss may be diminished. Here it will be noted that the slats 35 are disposed on the lower surface of the reference cylinder 49 equally on either side of a reference line 55 and on an arc subtending an angle $\rho$. Assume $\rho$ is 90°. Therefore, the slats are disposed on a total arc of 90° of the lower surface of the reference cylinder 49, the slats being divided equally on either side of the line 55 which bisects the angle $\rho$. It should be understood that other angles, either less than a total arc of 90° or up to approximately 180°, may be used in forming the reflector 31. Since the line 55 bisects the angle $\rho$, it equally divides the width of the primary reflector 31. A tangent line 57 is drawn normal to the bisecting line 55 and tangent to the surface of the reference cylinder 49 at the midpoint of the width of the reflector 31. The angle $\lambda$ then lies between this tangent line 57 and the horizontal line H. One acceptable angle for $\lambda$ is $22\frac{1}{2}°$. Other angles, or no inclination at all, may be desirable in view of local circumstances.

In this example given, the plane of reference for determining the inclination of each slat 35 (FIG. 5) for convenience may be a plane that includes the tangent line 57.

Where the bed is carved out of the earth's surface and the bed is inclined toward the sun, the side of the bed away from the sun will be elevated slightly above the side of the bed that is toward the sun. In the northern hemisphere, this inclination would be toward the southern sky, and in the southern hemisphere, this inclination would be toward the northern sky. Such elevation of one side of the bed, however, may result in an embankment of earth, or a wall buildup, to provide the base for the reflector surface. Such construction may considerably increase the cost of the solar concentrator because of the nature of the terrain in which it is constructed. Further, accuracy of position of the reflective surface is critical to accurate focusing and alignment, which are all important for high performance solar concentration.

Reference is made now to FIG. 7 wherein there is illustrated a preferred embodiment incorporating features of this invention that result in a low cost, accurate construction of a concentrator.

Briefly, a pair of long, thin flexible tension members, such as wires or cables, are used to mount each reflecting element. The resulting plurality of such pairs of tension members are supported and positioned in spaced relation in a cylindrical array, with the tension members of each pair extending in the axial direction of the array and spaced equidistantly apart by supporting means, such as bulkheads, at each end of the array. These end support means are sunk into the earth to act as anchors and to react the tension forces in the tension members. Tensioning means for maintaining the tension members taut are also provided. Intermediate support members are added as required along the length of the tension members between the ends of the array to reduce sag, to maintain the tension member position, and to stabilize the system against forces of movement, such as wind. These intermediate supports do not take tension. The lines are stretched to almost their yield strength in order to be straight and taut. Each reflecting element mounted on each pair of tension members is reflective of radiation from a source, such as the sun. The tension members of each respective pair are disposed relative to one another to reflect the radiation from substantially all of the reflecting surfaces to the receptor.

More specifically, there is shown in FIG. 7 an array of long, thin flexible tension members, such as wires or cables 59, and a support means, such as a bulkhead 61, supporting the cables 59. The bulkhead includes a base 63 that is conventionally anchored in the earth.

Extending upright from the base 63 is a front vertical support member 65. The cables 59 are shown terminating in a tension means, such as a tension plate 67. This tension plate is attached to the front vertical support member 65 by suitable attaching means, such as a plurality of threaded bolts 69 and nuts 71. When the nuts 71 are uniformly tightened against the plate 67, a tension force is applied along the length of the cables 59. Similarly, at the other end of the array (not shown) a bulkhead is provided for the support system to mount and support the opposite ends of the cables 59. Suitable means for attaching the cables also are provided at the other end. It may be desirable to provide means for adjusting tension of the cables at both ends of the cables. Otherwise, an adjusting means, such as the plate 67, the bolts 69 and the nuts 71, at only one end need be provided.

An intermediate support 71 is provided along the length of the cables in between the ends of the array. This intermediate support is also conventionally anchored in the earth by a base 73 on which is mounted a cable support plate 75 by suitable attaching means, such as a pair of back-to-back angle plates 77.

The form of the support plate 75 best illustrates the disposition of the cables 59 in forming the preferred cross section of the array. The plate 75 is seen in side view in FIG. 8 and has a saw-toothed or stepped top edge 78 that generally is in the form of a circular arc and comprises a series of steps 80. The plate is mounted such that one end of the arc is higher than the other. As viewed in FIG. 8, the left end of the arc is the high end. For purposes of illustration, this arc may be considered a portion of a cylinder of reference 49a and may be compared to the reflector 31 and reference cylinder 49 of FIG. 6.

The stepped top edge 78 is formed in a particular fashion to provide a pattern of supports or cradles for the cables 59 that is consistent with the disposition of the cables in the array. For this reason, the array can best be explained by reference to this stepped top edge 78.

Figure 9:
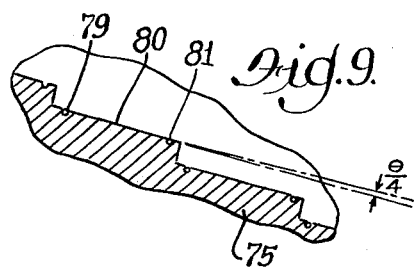
FIG. 9 is a fragmentary view of an enlarged portion of the upper edge of the support member of FIG. 8.

As seen in FIG. 9, it will be noted that each step 80 includes two spaced apart U-shaped indentations 79 and 81. For purposes of description, the indentations 79 are the left ones of each pair as viewed in FIGS. 8 and 9, and the indentations 81 are the right ones of each pair. Preferably, the spacing between the indentations 79 and 81 is equal among all the steps 80 in the illustrated structure.

Certain lines of reference are shown in FIG. 8 that have counterparts in FIGS. 5 and 6. Reference numbers of these corresponding parts are identified in FIG. 8 with the subscript "$a$". Accordingly, an arc 83 generally formed by the stepped top edge 78 of the support plate 75 subtends an angle $\rho$ at the axis 51a. The angle is illustrated as 90° for purposes of description, but it should be understood that it could differ from this without deviating from the principle of the invention. The angle $\rho$ could be less than 90°, or it could exceed 90° so as to approach 180°. The line 55a bisects this 90° angle and the arc 83. The arc 83 thus represents one-quarter of the reference cylinder 49a.

Figure 10:
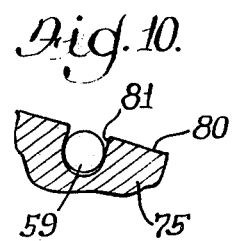
FIG. 10 is a fragmentary view of an enlarged portion of the illustration of FIG. 9.

The U-shaped indentations 79 and 81 are formed in the steps 80 of the plate 75 to cradle the cables 59 as shown in FIGS. 9 and 10. As best seen in FIG. 10, the diameter and depth of each U-shaped indentation is such that each supported cable will fit therein so that the lands on either side of the indentation form a continuous plane across the top of the inserted cable. The indentations of each step support a pair of cables and serve to maintain the spaced apart condition of the cables. Further, because the cables are cradled in the indentations, such intermediate support does not take any of the tension loads on the cables.

These indentations are also related in each pair along with their associated step 80 to maintain a certain inclination of the respective planes formed by each pair of cables supported thereby with respect to the axis 51a. The disposition of the cables is primarily determined by the end mounting supports, and the intermediate support or supports maintain this disposition. The location of the points of connection on the end mounting supports is therefore in accord with disposition and relationship of the indentations of the support plate 75. Accordingly, by describing the relationship of each of these pairs of indentations with respect to the axis 51a by reference to the support plate 75, it will be understood that the end supports and any other intermediate supports have a layout consistent therewith.

Referring now to FIG. 5, it will be remembered that the inclination of each slat 35 (FIGS. 5 and 6) was determined by its positional relationship with respect to a line (Z axis, FIG. 5 and line 55, FIG. 6) or plane bisecting the total reflector. Thus, in FIG. 5, a line from the axis 51 to the center of the width of a slat 35 forms an angle $\theta$ with the Z axis, and the inclination of the slat 35 is $\theta/4$ from the horizontal line H. In FIG. 5, the Y axis is horizontal and the Z axis is vertical. When the whole system is rotated (the reflector tilted) as shown in FIG. 6, the Z axis of FIG. 5 is replaced for reference purposes by the bisecting line 55 of FIG. 6 and the line H of FIG. 5 is replaced for reference purposes by the line 57, which is tangent to the reference cylinder 49 at the point where the bisecting line 55 intersects the cylinder. The base slat 35' intersected by the bisecting line of reference 55, of course, is normal to the line 55 and parallel to the tangent line 57, because $\theta$ is zero in this instance. Such a base slat, a tangent line and a line from the axis to the center of the base slat form the frame of reference for all other reflective surface dispositions. If for some reason, additional reflective surfaces extend the arc further away from the base reflective surface in one direction than the other, a line from the axis bisecting the base reflective surface is the reference line rather than a line bisecting the angle subtended by a total arc that includes such imbalance of surfaces.

Transferring this relationship to FIG. 8, the line 57a is tangent to the reference cylinder 49a at the midpoint of the base position 35'a for a reflective surface, which is the point where the line 55a intersects the cylinder. The line 57a forms an angle $\lambda$ with respect to the horizontal H. Any line drawn from the midpoint between each pair of indentations and the axis 51a forms an angle $\theta$ between it and the line 55a. The slope of the line joining the respective pair of indentations is then $\theta/4$ with respect to the tangent line 57a. The angle $\theta/4$ is illustrated in FIG. 9. The structure maintains this relationship irrespective of the value of the angle $\lambda$.

It can be understood that a pattern for such a layout can be applied to all supporting members and the support plates thus mass-produced to effect economies. As will be seen hereinafter, many such supports may be needed on a large area installation.

The array of cables 59 thus formed provides a support system for the reflecting elements, which are attached to the tension cables in a variety of ways. One such is shown in FIG. 11. This Figure illustrates a flexible film of plastic, such as MYLAR, manufactured by E. I. DuPont de Nemours, that is aluminized in a known manner to provide a reflecting element 85. The aluminized plastic is then wrapped around a pair of tensioned cables 59 and sealed. Generally, this plastic would be first formed in longitudinal strips and then applied to the respective pairs of cables with the side edges of the strips formed around the cables as indicated. The reflecting surface so formed is then substantially parallel to the plane defined by the respective cables supporting the surface.

Alternatively, the plastic may be in the form of a tubing 87 and wrapped around the cables as shown in FIG. 12. In this instance, spacer bars 89 in the form shown in FIG. 12 are inserted along the length of the cables 59 to further assist in maintaining the spaced relation of the respective pairs of cables 59. This spacer 89 may be of any suitable material for the purpose.

Although both of the previously described forms of reflective surfaces extend longitudinally of the cables that support them, this need not necessarily be so. It may be desirable to provide strips or sheets that extend transversely of the array of cables. An example of such a transverse arrangement is shown in FIG. 13, where a continuous length of mirrorized film 91 is threaded under and over the respective pairs of cables 59 to form the reflecting surfaces intermediate the respective pairs. These lengths 91 may be in a form that ranges from narrow strips to wide sheets. In such continuous transverse form, however, the mirror surface when stretched would tend to pull the pairs of tensioned support cables together and impair the alignment of the cables over long spans. To assist in maintaining the spaced relationship under this condition, additional intermediate supports, such as those shown in FIG. 8, should be utilized by placing them in frequent intervals along the length of the cables. Such intermediate supports also serve to keep the mirrorized film surfaces stretched tightly across their widths.

Other alternative forms of reflective surfaces are shown in FIGS. 14-19 inclusive wherein mirrorized glass strips 92 are utilized. These strips can be in the nature of ordinary glass mirrors attached to the cables by means, such as a spacing clip 93 illustrated in FIG. 14. This spacing clip is preferably in the form of spring wire and is so formed to also maintain cable separation as shown as well as retain the glass on the cables. Such clips are applied periodically along the length of the cables as needed to adequately secure the glass mirror strips.

An alternative form of the wire clip is shown in FIG. 15, and this form includes a pair of individual clips 95 and 96 that are constructed so that when disposed opposite each other along the edge of the glass, the glass itself serves as the cable spacer, being snugly positioned between the inwardly arcuate vertical sides 98 and 98a of the clips.

Generally, the length of the cables exceeds the practical length for a glass strip, and so more than one glass strip are united in end-to-end succession along the length of the cables. FIG. 16 illustrates a uniting of the ends of two successive lengths of glass 92 in the form of a splice 97. This splice is made by applying a clip 99 that laps the two abutting ends of the successive glass strips 92 to make these abutting ends fast. Although the kinds of clips illustrated in FIGS. 14 and 15 could be utilized for the splice 97, the clip 99 is preferred for such a splice and is illustrated in FIGS. 17-19. In FIG. 17, the clip 99 is seen from the top and includes a base 101 which has a length substantially equal to the width of the glass reflecting elements 92 it is to secure and a width adequate to lap the end portions of the two abutting glass elements.

FIGS. 18 and 19 illustrate two different forms of the clip 99. Preferably, this clip is formed of an extruded metal, such as aluminum. The clip 99a (FIG. 18) includes two edge engaging elements 103 and 105, one at each end of the base 101, and two cable lugs 107 and 109. The cable lugs 107 and 109 are provided on the underside of the clip and are each bent inwardly so as to engage the respective pairs of cables 59 from the outside.

The clip 99b (FIG. 19) is similar to the clip 99a, but the clip 99b has cable lugs 111 and 113 provided on the underside of the clip, and these lugs are directed outwardly in their bends to grip the pairs of cables 59 from the inside. By alternating these clips 99a and 99b along the length of the cables, the clips not only grip the glass and secure the glass to the cables, but also serve to maintain the equidistant spacing of the cables of each pair along their length.

These extruded clips are preformed for application to a predetermined width and thickness of glass strip and diameter of cable, dimensions of which are provided hereinafter.

The illustrated forms of the reflective elements indicate substantially flat surfaces. It is conceivable, although not preferable, to combine two or more elements in width, in which instance the reflecting elements would have a slightly arcuate surface to confine the reflected rays to the receptor 41a. Such construction could still be utilized in the manner described herein for focusing reflected rays on the surface of the reference cylinder 49a and thus would be within the principles of this invention. In this connection, although suggested materials for the reflecting elements have included aluminized MYLAR and glass mirror strips, other materials may be appropriate. For example, other materials could include reflective metal sheet or foil, composite layers of plastic and metallized plastic sheet.

Referring once again to FIG. 7, the concept of using tensioned elements for supporting parts of the concentrator is applicable also to the heat absorber pipe, i.e., the receptor 41a. This receptor 41a moves in a path coincident with the upper surface of the cylinder of reference 49a in the same manner as described for the pipe 41 on the reference cylinder 49 of FIG. 1. To accomplish this movement, the receptor 41a is mounted at its ends by an arm 43a which has a base arranged with a pivot member 114 for rotation in a bearing 115. The bearing 115 is supported on the top of the front vertical support member 65 of the bulkhead 61 and is located so that the axis of rotation of the pivot member 114 is coincident with the axis 51a of the reference cylinder 49a. This receptor 41a, since it is a target for the image formed by the reflected rays, should be maintained in a straight and accurate position along its length. This is accomplished in the illustrated embodiment as best seen in FIGS. 7, 20 and 21 by use of a pair of taut cables 117 and 119 suspended between the end receiver arms, such as the arm 43a in FIG. 7.

The tension force is applied to the receiver support cables 117 and 119 by means of an extension member 123 of cable 119 and another like extension member (not visible in side view) of cable 117 that pass through the outer end of the arm 43a and are anchored to the bulkhead 61 by means of a movable tension adjustment plate 125. This tension adjustment plate is mounted on the top of a rear vertical support member 127 that extends upwardly from the base 63 as an integral part of the bulkhead 61. The bulkhead 61 further has a cross support member 129 that ties the rear vertical support 127 to the front vertical support member 65. The tension adjustment plate 125 includes a suitable cable attaching means, such as a hook loop 131. The plate is slidably connected to the rear vertical support member 127 by conventional means, such as a plurality of hexhead bolts 133 extending through elongated slots (not shown) in the plate and into threaded openings (not shown) in the upper end of the rear vertical support member. The elongated slots extend parallel to the axis 51a. The location of hook loop 131 on axis 51a permits rotation of arm 41a about pivot 114 and bearing 115 with no change in the lengths of the cables 123, 117 or 119. Thus, tension may be applied to the cables 117 and 119 by connecting the extension members 123 to the plate and adjusting the plate until the desired longitudinal force putting the cables 117 and 119 under stress is achieved. The bolts 133 are then tightened to secure the plate. The extension members 123 (and one not shown) may be integral parts of the receptor support cables 117 and 119 respectively, the cables thus passing through the outer end of the arm 43a in much the same manner as violin strings pass through or over a bridge on a violin. Alternatively, the cables 117 and 119 could terminate at the arm 43a and the extension members could be separate supports extending between and attached to the bulkhead and the arm. Of course, other tension support and adjustment means may be utilized to accomplish taut support cables, and it is not intended that the invention be limited to the illustrated means. For example, the end support arm 43a could be constructed to maintain tension on the cables 117 and 119.

The receptor 41a is supported at its ends by the arms 43a and along its length by the receptor support cables 117 and 119 by means of an intermediate support plate 136. This support plate is triangular and is provided with openings as required for the cables and the receptor pipe 41a (FIG. 21). Alternatively, the intermediate support 136 could be made from three bars fabricated into a triangle, which construction allows increased open area. This latter construction is advantageous for reducing shadow losses from the sun.

The construction of the bulkhead 61 is shown for purposes of description and is not intended to be limited to illustrated form. As indicated previously, the rotating arm 43a could be constructed to take the full tension loads of the support cables and receptor, but the illustrated form utilizing the extension members is preferred because such inherently reduces the bending loads on the arm while permitting rotation of the arm. In connection with FIG. 7, it should be understood that although only one end of the support system and one intermediate support is illustrated, the support system includes another like end support and as many additional intermediate supports as are required for the system.

Figure 22:
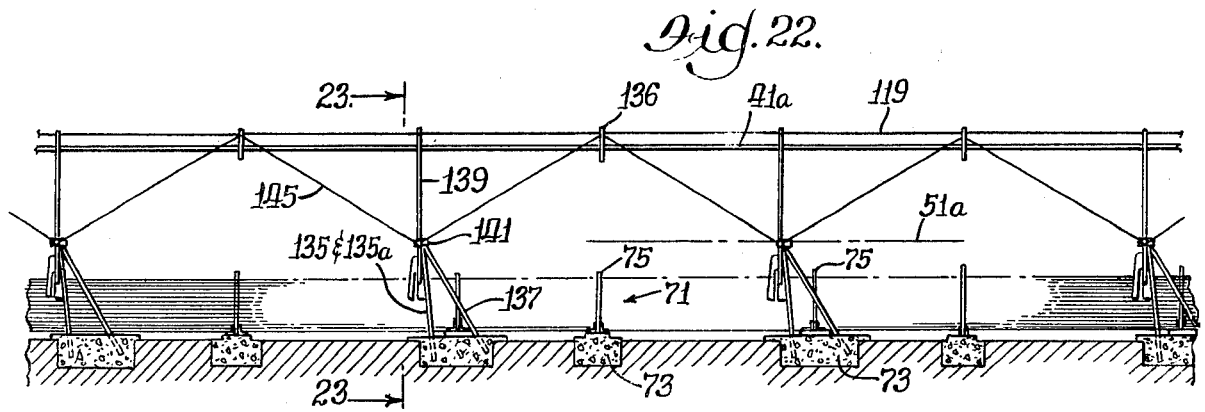
FIG. 22 is an elevational schematic view of an intermediate portion of the support system of FIG. 7.

In the support system herein illustrated and described, long spans of the receptor support cables 117 and 119 and the receptor 41a will also require rotating arms spaced periodically intermediate the ends of the system to provide for proper support and accurate movements of the receptor 41a in its path of movement. FIG. 22 illustrates a plurality of intermediate supports that may be used in this support system.

Figure 23:
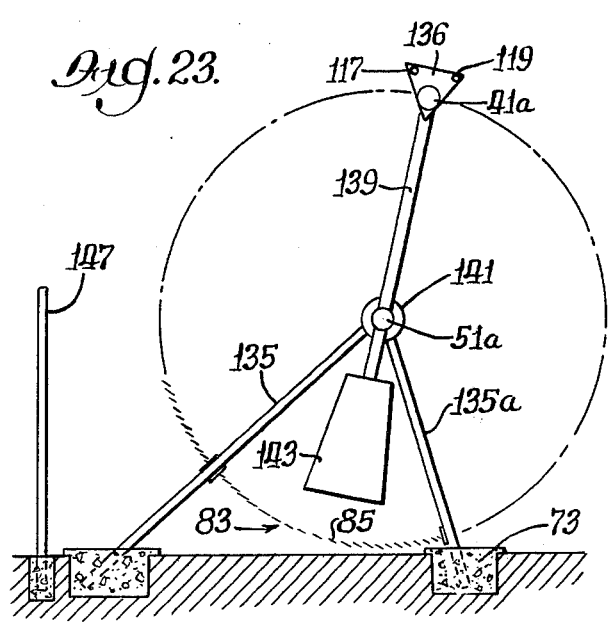
FIG. 23 is a sectional view taken along the line 23—23 of FIG. 22.

One intermediate rotating arm and its support is illustrated in FIG. 23. Here an intermediate rotating arm 139 is mounted to rotate in a bearing 141 that is supported on a tripod of pipes or posts 135, 135a and 137. Such tripod allows open areas in the support system to reduce loss by shadows. Extending away from the connection to the bearing 141 in a direction opposite the arm 139 is a counterweight 143 which is arranged to balance the moment of forces around the bearing 141 lying on the axis 51a of the system. The posts 135, 135a and 137 may have to extend through the array of cables on which the reflective surfaces 85 are mounted as indicated. Preferably, the posts 135, 135a and 137 are set in concrete bases, and these bases may coincide with the intermediate support bases 73 as indicated in FIG. 22. It will be noted that the post 137 is directed on an angle such that there is a longitudinal component as well as a sideways component of support. Additionally, stringers 145 are provided for longitudinal support in a large scale system, and these extend between the triangular support plates 136 and the points of rotation of the arms 139 as indicated. Also, it may be desirable to add support to the receptor 41a span by providing a truss-like structure (not shown) along the triangular cross-sectional support system of the receptor and thereby tying in the succession of plates 136.

The drive system for the rotating arms is not herein illustrated, and many of the mechanical and construction details likewise have been omitted in the interest of simplifying the description of the invention. It should be understood that in these areas conventional mechanical drive systems may be employed to implement the illustrated embodiment of the invention.

As examples of functional dimensions and other quantities for the preferred embodiment, the cables 59 are five thirty-seconds of an inch in diameter and are 200 feet long. A longitudinal force of 1,000 pounds is applied to place these cables under a tensile stress of about 52,000 psi. The members of each pair of cables are spaced apart by approximately four inches to their outsides. Ordinary glass mirror reflecting elements are, of course, heavier than other forms such as plastic or foil. Consequently, the weight of glass tends to cause more sag along the length of the cables than do these other forms. It has been found that if one-sixteenth inch thick, 4-inch wide glass is used and the cables are tensioned to about 1,000 pounds force, then the intermediate supports should be located at approximately 25-foot intervals, to keep the sag to less than 0.3 inches between supports. Such sag is within the tolerance for accurate focusing. Sag that is normal to the plane of the surface, e.g., near the center of the mirror, does not affect the focus to the extent that sag having an angular component would. With such a support, the flutter caused by a wind at up to about 10 mph. is less than approximately 5 percent of the strip width. In this connection, it is desirable that the system be capable of limiting torsional oscillation of the reflecting elements to 0.25° In a 25 mph. wind and be able to survive 100 mph. winds. A wind fence 147 may be provided along side the system to protect against the effects of the wind. The supports for the intermediate rotating arms 139 are provided at 50-foot intervals. Thus every other intermediate reflection support 71 shares a base 73 in common with the tripod support of the arms 139. These intermediate supports do not take up any tension forces, but serve to maintain the spacing and elevation of the various parts of the concentrator. As to the intermediate support illustrated in FIG. 8, a quarter-inch thick aluminum plate with U-shaped indentations sized for the cables cradled therein as illustrated in FIG. 10 is utilized. The overall width of the array, e.g., along the line H in FIG. 8, is approximately 21 feet.

The foregoing quantities are representative and are not intended as limitations of the invention. For example, the cable diameter preferably is within a range of from one-eigth to one-quarter of an inch, the glass mirror thickness preferably is within the range of from one-sixteenth to one-quarter of an inch, the span between the mirror supports 71 is preferably within a range of from 20 to 40 feet and the span between the intermediate rotating arms 139 is preferably within a range of from 40 to 80 feet. Although cable lengths of 200 feet between end supports have been indicated, it is feasible with these intermediate supports to greatly extend the length of the mirrors, possibly up to one mile. Although the receiver 41a has been referred to also as a pipe 41a, it is not intended that it be limited to a single pipe. The receiver 41a may include a cluster of adjacent pipes, and the pipe or pipes may each include a concentric arrangement of pipes. An example of a concentric arrangement is described in the aforementioned U.S. Pat. No. 3,868,823, and some of the fluids that may be utilized in the pipes and connections for tying the concentrator into a working relationship with other devices for the utilization of the concentrated energy are also described therein.

In summary, there has been presented a reflector system for concentrating radiation from a source to an elongated receptor, such as the receptor 41a, including a plurality of pairs of long, thin flexible tension members, such as the cables 59, and support means, such as the bulkhead 61, supporting the pairs in spaced relation in a cylindrical array (see FIGS. 7 and 8), with the tension members of each pair extending in the axial direction of the array and spaced substantially equidistantly apart. Further, there is provided tensioning means, such as the tension plate 67, bolts 69 and nuts 71, maintaining the tension members taut, with each of the pairs of tension members generally defining a respective plane and supporting reflecting elements, such as mirrorized glass strips 92 having a substantially planar surface reflective of radiation from the source, the reflective elements being mounted on the respective pairs of tension members with the planar surfaces substantially parallel to the respective ones of the planes formed by the pairs of tension members, and the tension members of each respective pair being relatively disposed to reflect the radiation from substantially all of the planar surfaces to the receptor. Where the source of radiation is the sun and the solar rays are constantly changing their angle of incidence, the receptor provided is movable over a path, and the pairs of tension members are fixed in their spaced relation in a circularly cylindrical array. The tension members of each respective pair are then relatively disposed to reflect the solar rays from all of the planar surfaces to substantially the same respective portion of the receptor path at each respective relative position of the sun.

Although the invention has been described in connection with a preferred embodiment, alternatives, modifications, and variations will be apparent to those skilled in the art in view of the foregoing description. Accordingly, it is intended to embrace all such alternatives, modifications, and variations as fall within the spirit and scope of the appended claims.

What is claimed is:

1. A reflector system for concentrating radiation from a source on an elongated receptor, said system comprising:
   a plurality of pairs of long, thin flexible tension members;
   support means supporting said pairs in spaced relation in a cylindrical array, with the tension members of each pair extending in the axial direction of the array and spaced substantially equidistantly apart;
   tensioning means maintaining said tension members taut, with each of said pairs of tension members generally defining a respective plane; and
   a plurality of thin reflecting elements each having a substantially planar surface reflective of radiation from the source, said reflecting elements being mounted on respective pairs of tension members with said planar surfaces substantially parallel to respective ones of said planes, the tension members of each respective pair being relatively disposed to reflect the radiation from substantially all of said planar surfaces to the receptor.

2. A system in accordance with claim 1 further comprising a support element along the length of said tension members intermediate the ends of the array to reduce sag in said tension members and to stabilize same, said support element maintaining the spaced relation of the pairs of tension members in the cylindrical array and the spacing of the members of each pair substantially equidistantly apart.

3. A system in accordance with claim 1 wherein the flexible tension members are cables.

4. A system in accordance with claim 1 wherein the reflecting elements are formed by a mirrorized film of plastic.

5. A system in accordance with claim 4 wherein the film of plastic is aluminized MYLAR.

6. A system in accordance with claim 4 wherein the mirrorized film of plastic extends in a continuous manner transversely of the array of tension members.

7. A system in accordance with claim 1 wherein the reflecting elements are formed of mirrorized glass strips extending longitudinally of the respective tension members on which they are mounted.

8. A system in accordance with claim 7 wherein the glass strips are retained in position on the respective pairs of tension members by a clip along each side edge of each glass strip.

9. A system in accordance with claim 8 wherein the clip includes means for retaining the tension members of each pair in the substantially equidistantly spaced apart condition.

10. A system in accordance with claim 1 wherein the reflecting elements are narrow strips extending longitudinally of the respective pairs of tension members on which the elements are mounted.

11. A reflector system for concentrating the heating effect of solar rays on an elongated receptor movable over a receptor path, said system comprising;
   a plurality of pairs of long, thin flexible tension members;
   support means supporting said pairs in fixed spaced relation in a circularly cylindrical array, with the tension members of each pair extending in the axial direction of the array and spaced substantially equidistantly apart;
   tensioning means maintaining said tension members taut, with each of said pairs of tension members generally defining a respective plane; and
   a plurality of thin reflecting elements each having a substantially planar surface reflective of solar rays, said reflecting elements being mounted on respective pairs of tension members with said planar surfaces substantially parallel to respective ones of said planes, the tension members of each respective pair being relatively disposed to reflect solar rays from substantially all of said planar surfaces to substantially the same respective portion of the receptor path at each respective relative position of the sun.

12. A system in accordance with claim 11 further comprising a support element along the length of said tension members intermediate the ends of the array to reduce sag in said tension members and to stabilize same, said support element maintaining the spaced relation of the pairs of tension members in the cylindrical array and the spacing of the members of each pair substantially equidistantly apart.

13. A system in accordance with claim 11 wherein the flexible tension members are cables.

14. A system in accordance with claim 11 wherein the reflecting elements are formed by a mirrorized film of plastic.

15. A system in accordance with claim 14 wherein the film of plastic is aluminized MYLAR.

16. A system in accordance with claim 14 wherein the mirrorized film of plastic extends in a continuous manner transversely of the array of tension members.

17. A system in accordance with claim 11 wherein the reflecting elements are formed of mirrorized glass strips extending longitudinally of the respective tension members on which they are mounted.

18. A system in accordance with claim 17 wherein the glass strips are retained in position on the respective pairs of tension members by a clip along each side edge of each glass strip.

19. A system in accordance with claim 18 wherein the clip includes means for retaining the tension members of each pair in the substantially equidistantly spaced apart condition.

20. A system in accordance with claim 11 wherein the reflecting elements are narrow strips extending longitudinally of the respective pairs of tension members on which the elements are mounted.

21. A system in accordance with claim 11 wherein the support means supporting said pairs in fixed spaced relation comprise a bulkhead anchored in the earth at each end of the array, said tensioning means being connected with at least one of said bulkheads.

22. A system in accordance with claim 11 further comprising in combination an elongated receptor movable over a path, said path lying on a portion of a cylinder whose radius is the radius of general curvature of the circular cylindrical array of said tension member pairs and generated about an axis extending parallel to said array, said portion of said path lying generally opposite on the same cylinder the portion thereof containing said array, the movement of said receptor being controlled to always be coincident with the same respective portion of the receptor path to which substantially all of said planar surfaces reflect the solar rays at each respective relative position of the sun.

23. A system in accordance with claim 22 wherein said receptor is a pipe supported by at least one tensioned cable extending in a taut condition between said support means to which said cable is also connected and by a plurality of radius arms separately supported for rotative movements about the axis of said cylinder.

24. A system in accordance with claim 22 wherein the axis of said cylinder lies in a predetermined first plane and the members of each respective pair of said tension members are disposed such that each respective plane formed by each said pair is inclined toward said axis and with respect to said predetermined first plane by an angle equal to one-quarter of the position angle of each said respective pair with respect to a second plane (a) also containing said axis and (b) being normal to said predetermined first plane, said position angle of each said respective pair being that angle which lies between said second plane and a line joining the center of the distance between each said respective pair to said axis.

* * * * *

UNITED STATES PATENT AND TRADEMARK OFFICE
CERTIFICATE OF CORRECTION

PATENT NO. : 4,071,017
DATED : January 31, 1978
INVENTOR(S) : Russell, Jr. and Potthoff It is certified that error appears in the above—identified patent and that said Letters Patent are hereby corrected as shown below:

| | |
|---|---|
| Col. 2, line 20 | "reflecting" should be --reflective--. |
| Col. 2, line 21 | "reflecting" should be --reflected--. |
| Col. 2, line 24 | "reflective" at the end of the line should be --reflector--. |
| Col. 4, line 65 | "incoincidence" should be --in coincidence--. |
| Col. 6, line 64 | "inpinge" should be --impinge--. |
| Col. 13, line 63 | "In" should be --in--. |

Signed and Sealed this

Twenty-fifth Day of July 1978

[SEAL]

Attest:

RUTH C. MASON
Attesting Officer

DONALD W. BANNER
Commissioner of Patents and Trademarks